(No Model.)

W. A. HANLEN.
PIPE LIFTER.

No. 463,048. Patented Nov. 10, 1891.

Witnesses
A. J. Schwartz
J. F. Reily

Wm. A. Hanlen,
Inventor
By W. T. Fitzgerald & Co.
Attorneys

UNITED STATES PATENT OFFICE.

WILLIAM AUGUSTIN HANLEN, OF RENFREW, PENNSYLVANIA.

PIPE-LIFTER.

SPECIFICATION forming part of Letters Patent No. 463,048, dated November 10, 1891.

Application filed April 28, 1891. Serial No. 390,882. (No model.)

*To all whom it may concern:*

Be it known that I, WILLIAM AUGUSTIN HANLEN, a citizen of the United States, residing at Renfrew, in the county of Butler and State of Pennsylvania, have invented certain new and useful Improvements in Pipe-Lifters; and I do hereby declare the following to be a full, clear, and exact description of the invention, such as will enable others skilled in the art to which it appertains to make and use the same.

My invention consists in a new and improved pipe-lifter for removing cylindrical pipes or tubing from oil, water, gas, or other driven wells, and the invention will be hereinafter fully described and claimed.

Figure 1:
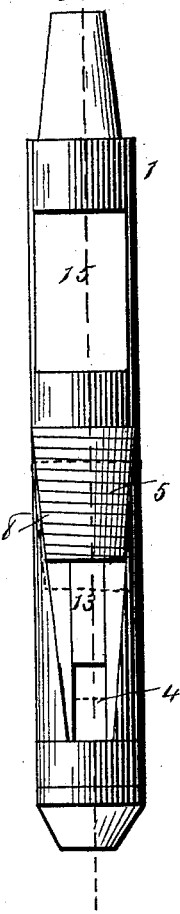
Figure 2:
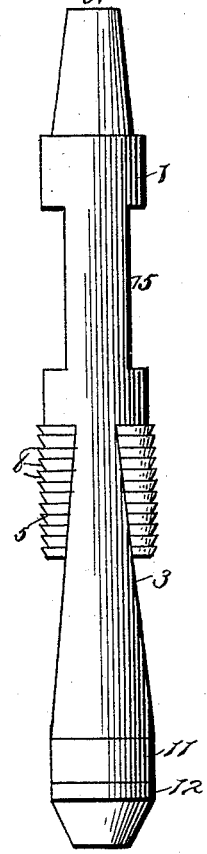
Figure 3:
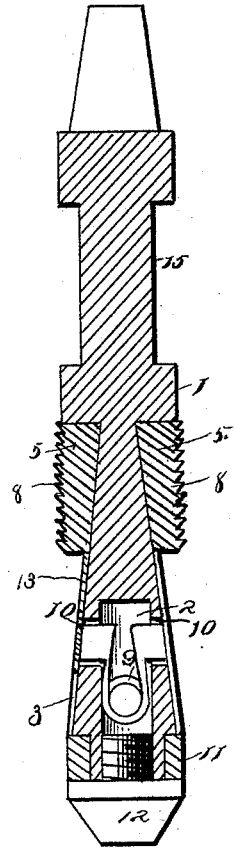
Figure 4:
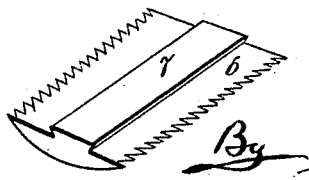

Referring to the accompanying drawings, Figure 1 is a side elevation of my new and improved pipe-lifter. Fig. 2 is a similar view taken at right angles to Fig. 1. Fig. 3 is a longitudinal central sectional view taken on the line A A in Fig. 2. Fig. 4 is a detail view of one of the corrugated clamps.

The same numerals of reference indicate corresponding parts in all the figures.

Referring to the several parts by their designating-numerals, 1 indicates the cylindrical body of the pipe-lifter, of such shape as to adapt it to enter the tubular end of a pipe. The device may be made of different sizes to fit in tubing of different diameters. The lower end of the body 1 is formed with the longitudinal bore or opening 2, and its exterior is formed with the oppositely-inclined seats 3, which incline inward toward the upper end, as shown. The central parts of these seats 3 are formed with the longitudinal grooves 4, the edges of which are dovetailed. On these seats fit and slide the clamps 5, which are wider at their upper than at their lower ends and are formed with the straight inner faces 6, adapted to fit on the flat seats 3, and with the curved outer faces corresponding to the general curvature of the cylindrical body 1. The inner face of such clamp is formed with a guide-strip 7, the edges of which are beveled to adapt them to fit in the dovetailed edges of the grooves 4, by which construction the clamps are retained in position as they move up and down on the seats 3. The exterior rounded faces of the clamps are formed with a series of transverse inclined teeth 8, arranged with their sharp straight edges upward, as shown, and these teeth are also spirally arranged, for the purpose hereinafter specified.

Within the hollow lower end of the body 1 fits the coil-spring 9, the flattened free ends $9^a$ of which project out through slots 10 in the grooved lower end of the body 1. The lower end of the body 1 is closed by a removable cap and ring 11 12.

In the lower end of grooves 4 fit slides or covers 13, and when the clamps are raised to the upper ends of the seats, as shown in Fig. 1, these slides are pushed up to cover the slots 10 and prevent entrance of dirt or any obstruction.

In operation, when a section of pipe is to be removed, the device is lowered into the upper end of the same, with the clamps raised to the upper end of the seats, as shown in Fig. 1. The power is then applied to the upper end of the body 1 to pull the same upward, when the sharp upper edges of the teeth 8 on the outer faces of the clamps project within the interior of the pipe end, holding the clamps stationary while the body 1 is drawn upward. As the clamps thus slide down on the seats 3 they push the slides 13 down below the slots 10, allowing the free ends of the spring 9 to project through the said slots and press against the inner sides of the clamps. The clamps are thus forced outward, which brings them into still firmer contact with the interior of the pipe, while as they slide down the inclined seats 3 they project out beyond the normal diameter of the body 1, causing the teeth 8 to bite firmly in the metal pipe-section.

It will be seen that by this construction the device 1 automatically engages with the end of the pipe, so that on drawing it up the pipe will be lifted with it and thus raised out of the ground.

The upper end of the body 1 is formed with the flat opposite recesses 15, so that a wrench can be applied to its upper end for the purpose of turning it to remove it from the pipe end, the spiral arrangement of the threads or teeth 8 on the clamps permitting of this movement.

Having thus described my invention, what I claim, and desire to secure by Letters Patent, is—

1. The combination of the body 1, having the hollow lower end formed with the inclined seats 3, the grooves 4, and the slots 10, opening through said inclined sides into the hollow lower end of the body, the spring 9, coiled around at its center and having its flattened free upper ends 9ª extending through the slots 10, and the sliding clamps formed on their inner faces with the guide-strips and on their outer faces with a series of inclined teeth, substantially as set forth.

2. The combination of the body 1, formed with the inclined seats 3, the grooves 4, the hollow lower end, and the slots 10, the spring arranged within the hollow lower end of the body with its ends extending through the slots 10, the sliding clamps having the guide-strips on their inner faces and the outer inclined series of teeth, and the slides 13, sliding in the grooves 4 below the clamps, substantially as set forth.

In testimony whereof I affix my signature in presence of two witnesses.

WILLIAM AUGUSTIN HANLEN.

Witnesses:
REUBEN MCELVAIN,
JOHN T. ARWIN.